(12) United States Patent
Yamane (10) Patent No.: US 9,832,045 B2
(45) Date of Patent: Nov. 28, 2017

(54) DIGITAL SIGNAL OFFSET ADJUSTMENT DEVICE AND METHOD AND PULSE PATTERN GENERATION APPARATUS

(71) Applicant: ANRITSU CORPORATION, Kanagawa (JP)

(72) Inventor: Kazuhiro Yamane, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 295 days.

(21) Appl. No.: 14/886,707

(22) Filed: Oct. 19, 2015

(65) Prior Publication Data

US 2016/0190797 A1 Jun. 30, 2016

(30) Foreign Application Priority Data

Dec. 24, 2014 (JP) ................................ 2014-260818

(51) Int. Cl.
*H04L 25/02* (2006.01)
*H02H 3/08* (2006.01)
*H02H 3/087* (2006.01)

(52) U.S. Cl.
CPC ......... *H04L 25/0284* (2013.01); *H02H 3/087* (2013.01)

(58) Field of Classification Search
CPC ........................... H04L 25/0284; H02H 3/087
See application file for complete search history.

(56) References Cited

U.S. PATENT DOCUMENTS 6,493,200 B1 * 12/2002 Farmer .................... H02H 3/12
348/E7.052
7,511,577 B2 * 3/2009 Bradley .................... H03F 1/30
330/296
7,613,239 B2 * 11/2009 Shiratsuchi ........... H03F 1/3211
375/130

FOREIGN PATENT DOCUMENTS

JP 4256894 B2 4/2009
JP 4261555 B 4/2009
WO 2006035896 A1 4/2006

* cited by examiner

*Primary Examiner* — Scott Bauer
(74) *Attorney, Agent, or Firm* — Pearne & Gordon, LLP (57) ABSTRACT

The synthetic circuit 16 synthesizes an offset voltage from an offset voltage generator 14 with a signal output from the other end of the first coil 15 and supplies the synthesized signal to the other end of the second coil 18 through an output matching resistor 17. A potential difference detection unit 21 detects a potential difference between both ends of the output matching resistor 17. A comparison circuit 23 outputs an overcurrent detection signal when a voltage value of a detection signal from the potential difference detection unit 21 exceeds a positive or negative threshold voltage. When the overcurrent detection signal is input, a control unit 24 turns off the switching means 19 and forcibly disconnects the synthetic circuit 16 from the output matching resistor 17.

11 Claims, 3 Drawing Sheets

DIGITAL SIGNAL OFFSET ADJUSTMENT DEVICE AND METHOD AND PULSE PATTERN GENERATION APPARATUS

TECHNICAL FIELD

The present invention relates to a digital signal offset adjustment device and method that applies an offset voltage which is an arbitrary DC voltage to a digital signal and outputs the digital signal and a pulse pattern generation apparatus using the digital signal offset adjustment device.

BACKGROUND ART

In recent years, when semiconductor devices or various devices used in a digital communication system whose communication rate has increased to a gigahertz frequency band are tested, it is necessary to supply a bias voltage (offset voltage) corresponding to the input interface of a device under test, which is a device to be tested, to a high-speed digital signal.

The inventors have proposed a digital signal offset adjustment device that applies a bias voltage which is an arbitrary DC voltage to a digital signal and outputs the digital signal, as disclosed in the following Patent Document 1.

Figure 3:
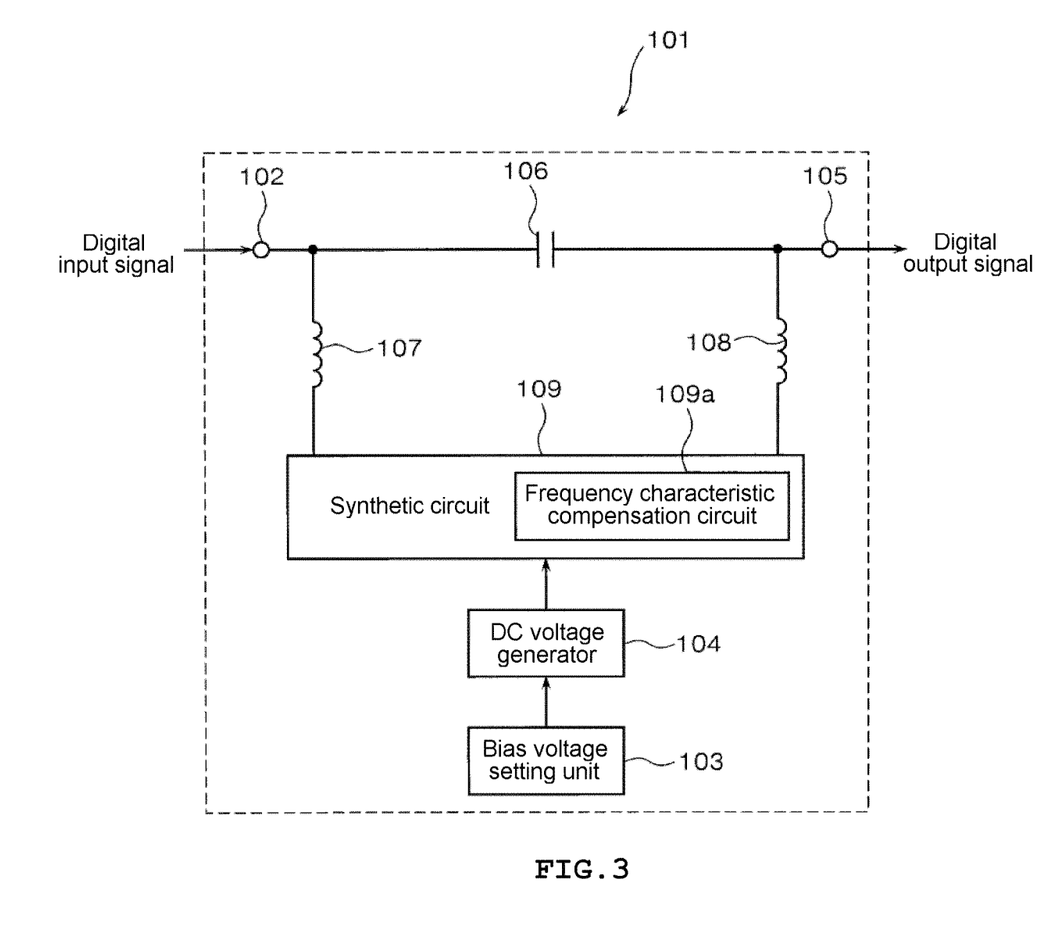
FIG. 3 is a diagram illustrating the structure of a digital signal offset adjustment device according to the related art disclosed in Patent Document 1.

As illustrated in FIG. 3, a digital signal offset adjustment device 101 disclosed in Patent Document 1 includes an input terminal 102 to which a digital input signal that has broadband frequency characteristics including a low-frequency component, a DC component, and a high-frequency component is input, a DC voltage generator 104 that outputs a desired DC bias voltage set by a bias voltage setting unit 103, an output terminal 105 for outputting a digital output signal obtained by adding the DC bias voltage output from the DC voltage generator 104 to the low-frequency component, the DC component, and the high-frequency component of the digital input signal input to the input terminal 102, a capacitor 106 that is connected between the input terminal 102 and the output terminal 105 and passes the high-frequency component of the digital input signal input to the input terminal 102 to the output terminal 105, a first coil 107 that has one end connected to the input terminal 102 and passes the low-frequency component and the DC component of the digital input signal to the other end, a second coil 108 that has one end connected to the output terminal 105, and a synthetic circuit 109 that has a first input end connected to the other end of the first coil 107, synthesizes the low-frequency component and the DC component of the digital input signal which is input to the first input end through the other end of the first coil 107 with the DC bias voltage (offset voltage) output from the DC voltage generator 104 and outputs the synthesized signal from an output end to the output terminal 105 through the other end of the second coil 108. In addition, the synthetic circuit 109 includes a frequency characteristic compensation circuit 109a that compensates for frequency characteristics such that the gain of an operational amplifier increases as the frequency of the low-frequency component in the digital input signal output from the other end of the first coil 107 increases.

The digital signal offset adjustment device 101 includes the frequency characteristic compensation circuit 109a having the characteristic that the gain increases as the frequency of an AC component in the signal output from the other end of the first coil 107 increases. Therefore, it is possible to accurately transmit a broadband digital signal including a low-frequency component to a high-frequency component in a frequency band of several hundreds of hertz to several gigahertz, without any waveform distortion, and to appropriately test various devices used in the digital communication system.

The inventors have proposed a digital signal offset adjustment device disclosed in the following Patent Document 2 as an improvement of the digital signal offset adjustment device 101 disclosed in the above-mentioned Patent Document 1.

The digital signal offset adjustment device disclosed in Patent Document 2 includes an isolation circuit that is provided between the capacitor 106 and the output terminal 105, in addition to the structure illustrated in FIG. 3. An AC component of a digital input signal input to the input terminal 102 is transmitted to the output terminal 105 through the capacitor 106 and the isolation circuit. A DC component and a low-frequency component are extracted by the first coil 107 and are synthesized with a DC bias signal and the synthesized signal is supplied to the output terminal 105 through the second coil 108. In addition, the isolation circuit prevents the reverse flow of the low-frequency component to the input terminal 102. Therefore, it is possible to transmit a broadband waveform with low distortion, without being affected by a circuit connected to the output side, for example, without returning a reflected signal caused by mismatching to the input side.

Each of the isolation circuit and the synthetic circuit 109 includes a variable-gain amplifier. The digital signal offset adjustment device includes amplitude control means for controlling the variable-gain amplifier of each of the isolation circuit and the synthetic circuit 109 such that a digital signal with a designated amplitude value is output from the output terminal 105. Therefore, it is possible to apply an arbitrary DC offset to the digital signal to be output and to arbitrarily set the amplitude of the digital signal.

RELATED ART DOCUMENT

Patent Document

[Patent Document 1] Japanese Patent No. 4256894
[Patent Document 2] Japanese Patent No. 4261555

DISCLOSURE OF THE INVENTION

Problem that the Invention is to Solve

However, this type of digital signal offset adjustment device is connected to the device under test, which is the device to be tested, by a connector through a coaxial cable and inputs a digital signal with a desired pattern to the device under test. Alternatively, a contact of a probe that is connected to the digital signal offset adjustment device by a connector through a coaxial cable comes into contact with a terminal (a signal terminal, a power supply terminal, or a ground terminal) of the device under test and a digital signal with a desired pattern is input to the device under test. In this way, various tests are performed for the device under test.

However, in a case in which the digital signal offset adjustment device is used to perform various tests for the device under test, when the output is short-circuited or opened, a large potential difference or current difference occurs with respect to the offset voltage and an abnormal voltage is generated due to a transient response caused by the coil 108. As a result, electrical over stress (EOS) is likely to occur.

It is considered that the EOS is caused by various factors. For example, the EOS occurs in the following cases: a case in which, when an optical modulator using a laser diode with a low impedance of about several tens of ohms is the device under test (DUT) and the contact of the probe comes into contact with a pad (a signal terminal or a ground terminal) of the device under test to perform various tests, the contact of the probe is instantaneously separated from the terminal of the device under test, instantaneously comes into contact with the terminal of the device under test, or comes into contact with an incorrect position; a case in which, when measurement is performed for a semiconductor device as the device under test, there is an error in selecting the type or polarity of power supply and the power supply is inappropriately turned on and off; a case in which the digital signal offset adjustment device is connected to the device under test by a coaxial cable, with an inappropriate offset voltage being set; and a case in which, when the digital signal offset adjustment device is connected to the device under test by a connector through a coaxial cable, the connector is not deeply inserted and a loose connection occurs.

In the digital signal offset adjustment device according to the related art, when the output is short-circuited or opened due to the above-mentioned causes and an abnormal voltage is generated due to a high-voltage pulse caused by the coil, it is difficult to protect, for example, the high-frequency amplifier provided in the isolation circuit internal which has low resistance to EOS or the device under test connected to the output terminal. In addition, in recent years, in various types of measurement devices including this type of digital signal offset adjustment device, the frequency has increased with the miniaturization of a semiconductor process, a withstanding voltage has been reduced, and resistance to EOS has been reduced.

In some cases, a current limiting circuit for limiting the current to be supplied is provided in this type of digital signal offset adjustment device and protects the circuit from overcurrent caused by, for example, a short circuit. However, in a case in which a constant current is continuously supplied to the coil during a short circuit and the short circuit is opened, and the device returns to the normal state, there is a concern that a high voltage will be generated between both ends of the coil and the internal circuit of the device or the device under test will not be protected from the high voltage and will be damaged.

The invention has been made in view of the above-mentioned problems and an object of the invention is to provide a digital signal offset adjustment device and method and a pulse pattern generation apparatus that can protect an internal circuit or a device under test from an abnormal voltage caused by the occurrence of a high-voltage pulse.

Means for Solving the Problem

In order to achieve the object, according to a first aspect of the invention, there is provided a digital signal offset adjustment device including: an input terminal; an output terminal; a capacitor that is provided between the input terminal and the output terminal and transmits an AC component of a digital signal input to the input terminal to the output terminal; a first coil that has one end connected to the input terminal and passes a DC component and a low-frequency component of the digital signal input to the input terminal; a second coil that has one end connected to the output terminal; an offset voltage generator that generates an offset voltage which is an arbitrary DC voltage; a synthetic circuit that synthesizes the offset voltage output from the offset voltage generator with the DC component and the low-frequency component of the digital signal output from the other end of the first coil and supplies the synthesized signal to the other end of the second coil; a resistor that is used for output matching and has one end connected to the other end of the second coil; switching means that has one end connected to the other end of the resistor and the other end connected to the synthetic circuit and connects or disconnects the synthetic circuit to or from the other end of the resistor; a potential difference detection unit that detects a potential difference between both ends of the resistor; a comparison circuit that compares a voltage value of a detection signal from the potential difference detection unit with a predetermined threshold voltage and outputs an overcurrent detection signal when the voltage value of the detection signal exceeds the threshold voltage; and a control unit that receives the overcurrent detection signal from the comparison circuit and turns off the switching means.

According to a second aspect of the invention, the digital signal offset adjustment device according to the first aspect may further include an isolation circuit that is connected in series to the capacitor between the input terminal and the output terminal, transmits a signal from the input terminal to the output terminal, and prevents the transmission of a signal from the output terminal to the input terminal.

According to a third aspect of the invention, the digital signal offset adjustment device according to the first or second aspect may further include an overvoltage protection circuit that clamps a high voltage which is generated by energy stored in the second coil to a constant voltage when the switching means is turned off.

According to a fourth aspect of the invention, in the digital signal offset adjustment device according to any one of the first to third aspects, when a predetermined time has elapsed from the turn-off of the switching means, the control unit may turn on the switching means and change the offset voltage to a target voltage over time to perform output control.

According to a fifth aspect of the invention, the digital signal offset adjustment device according to any one of the first to fourth aspects may further include a storage unit that stores an error log when the comparison circuit outputs the overcurrent detection signal indicating the occurrence of a failure.

According to a sixth aspect of the invention, there is provided a digital signal offset adjustment method including: a step of transmitting an AC component of a digital signal input to an input terminal to an output terminal through a capacitor; a step of transmitting a DC component and a low-frequency component of the digital signal input to the input terminal through a first coil that has one end connected to the input terminal; a step of generating an offset voltage which is an arbitrary DC voltage; a step of supplying a synthesized signal, which is obtained by synthesizing the offset voltage with a signal output from the other end of the first coil, from a synthetic circuit for supplying the synthesized signal to the other end of a second coil that has one end connected to the output terminal; a step of supplying the synthesized signal through a resistor that is used for output matching and has one end connected to the other end of the second coil; a step of detecting a potential difference between both ends of the resistor and outputting a detection signal; a step of outputting an overcurrent detection signal when a voltage value of the detection signal exceeds a predetermined threshold voltage; and a step of receiving the overcurrent detection signal and turning off switching means that has one end connected to the other end of the resistor and the other end connected to the synthetic circuit and connects or disconnects the synthetic circuit to or from the other end of the resistor.

According to a seventh aspect of the invention, the digital signal offset adjustment method according to the sixth aspect may further include a step of connecting an isolation circuit in series to the capacitor between the input terminal and the output terminal, transmitting a signal from the input terminal to the output terminal, and preventing the transmission of a signal from the output terminal to the input terminal.

According to an eighth aspect of the invention, the digital signal offset adjustment method according to the sixth or seventh aspect may further include a step of clamping a high voltage which is generated by energy stored in the second coil to a constant voltage when the switching means is turned off.

According to a ninth aspect of the invention, the digital signal offset adjustment method according to any one of the sixth to eighth aspects may further include a step of turning on the switching means and changing the offset voltage to a target voltage over time to perform output control, when a predetermined time has elapsed from the turn-off of the switching means.

According to a tenth aspect of the invention, the digital signal offset adjustment method according to any one of the sixth to ninth aspects may further include a step of storing an error log when the comparison circuit outputs the overcurrent detection signal indicating the occurrence of a failure.

According to an eleventh aspect of the invention, there is provided a pulse pattern generation apparatus including: a pattern signal generation unit that generates a digital signal with an arbitrary pattern; and the digital signal offset adjustment device according to any one of the first to fifth aspects that applies an offset voltage which is a desired DC voltage to the digital signal output from the pattern signal generation unit and outputs the digital signal.

Advantage of the Invention

According to the invention, it is possible to protect, for example, an internal circuit (for example, a high-frequency amplifier) which has low resistance to EOS or a device under test which is connected to the output terminal by a connector from an abnormal voltage.

In addition, since the isolation circuit is connected in series to the capacitor between the input terminal and the output terminal, it is possible to transmit a signal from the input terminal to the output terminal and to prevent the transmission of a signal from the output terminal to the input terminal. Therefore, it is possible to transmit a broadband waveform with low distortion, without being affected by a circuit connected to the output side, for example, without returning a reflected signal caused by mismatching to the input side.

When the short circuit of the output is opened and the device automatically returns to the normal state, control is performed such that the offset voltage added to the low-frequency component of the digital signal and the signal of the DC component slowly increases to a target voltage. Therefore, the offset voltage of the target voltage is not suddenly applied to the digital signal output from the output terminal and it is possible to safely return the device to a normal state.

In addition, the error log indicating the history of when the overcurrent detection signal indicating the occurrence of a failure has been output is stored. Therefore, the error log can be used as information used to investigate the cause of the generation of the abnormal voltage due to the generation of the high-voltage pulse by the coil.

BEST MODE FOR CARRYING OUT THE INVENTION

Hereinafter, embodiments of the invention will be described in detail with reference to the accompanying drawings.

First Embodiment

A first embodiment of a pulse pattern generation apparatus including a digital signal offset adjustment device according to the invention will be described with reference to FIG. 1.

Figure 1:
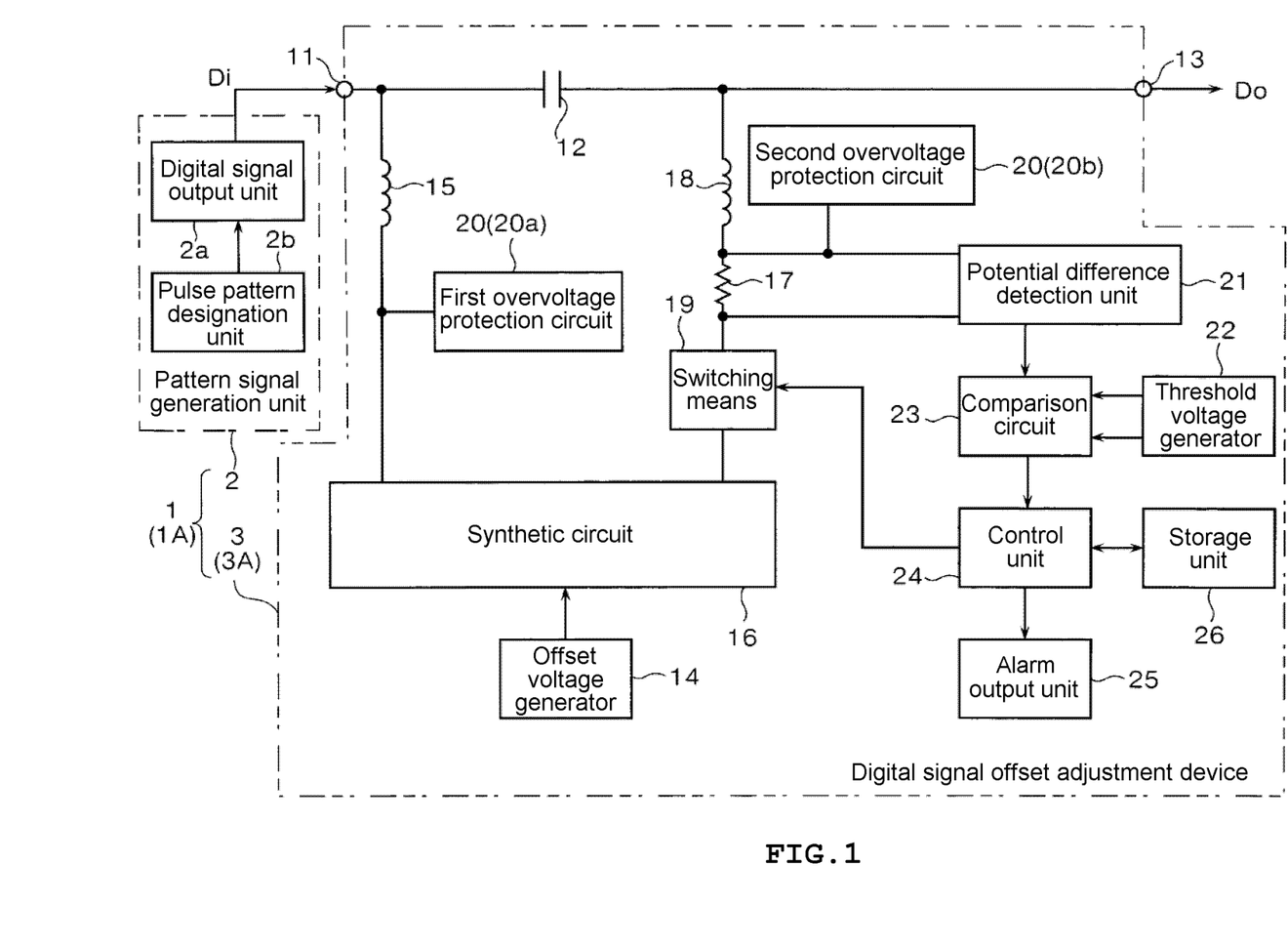
FIG. 1 is a block diagram illustrating a first embodiment of a pulse pattern generation apparatus including a digital signal offset adjustment device according to the invention.

As illustrated in FIG. 1, a pulse pattern generation apparatus 1 (1A) according to the first embodiment has a schematic structure including a pattern signal generation unit 2 and a digital signal offset adjustment device 3 (3A).

The pattern signal generation unit 2 generates a digital signal Di with a desired pulse pattern which is input to the digital signal offset adjustment device 3 when various tests are performed for a device under test and includes a digital signal output unit 2a and a pulse pattern designation unit 2b.

The digital signal output unit 2a outputs the digital signal Di having broadband frequency characteristics including a low-frequency component, a DC component, and a high-frequency component in the desired pulse pattern. The digital signal Di includes, for example, a data pattern in which the same bit data is continuous.

The pulse pattern designation unit 2b designates the pulse pattern of the digital signal Di to be output from the digital signal output unit 2a.

The digital signal offset adjustment device 3A applies an offset voltage which is an arbitrary DC voltage to the digital signal Di input from the pattern signal generation unit 2 and outputs a digital signal, whose offset has been adjusted by the applied offset voltage, as a test signal to the device under test that is connected by a connector through a coaxial cable.

As illustrated in FIG. 1, the digital signal offset adjustment device 3A includes an input terminal 11, a capacitor 12, an output terminal 13, an offset voltage generator 14, a first coil 15, a synthetic circuit 16, a resistor 17, a second coil 18, switching means 19, an overvoltage protection circuit 20, a potential difference detection unit 21, a threshold voltage generator 22, a comparison circuit 23, a control unit 24, an alarm output unit 25, and a storage unit 26.

The input terminal 11 is connected to the digital signal output unit 2b of the pattern signal generation unit 2. The digital signal Di having broadband frequency characteristics including a low-frequency component, a DC component, and a high-frequency component is input from the digital signal output unit 2a to the input terminal 11.

The capacitor 12 is connected between the input terminal 11 and the output terminal 13 and passes the high-frequency component of the digital signal Di input from the input terminal 11 to the output terminal 13.

The output terminal 13 outputs a digital signal Do obtained by adding a synthesized signal of a signal, which has been input from the input terminal 11 and extracted by the first coil 15, and an offset voltage generated by the offset voltage generator 14 to an AC component of the digital signal Di which has been input from the input terminal 11 and passed through the capacitor 12. The digital signal Do is input as the test signal to the device under test (DUT) (not illustrated), such as an optical modulator or a semiconductor device.

The offset voltage generator 14 generates an offset voltage which is a desired DC voltage and is fixedly or variably set and outputs the offset voltage.

The first coil 15 is a low frequency extraction coil which is connected between the input terminal 11 and the synthetic circuit 16. The first coil 15 passes the low-frequency component and the DC component of the digital signal Di input from the input terminal 11 to the other end.

The synthetic circuit 16 synthesizes the low-frequency component of the digital signal Di and the signal of the DC component which is input from the input terminal 11 through the first coil 15 with the offset voltage output from the offset voltage generator 14 and outputs the synthesized signal. The synthetic circuit 16 can be a known circuit disclosed in, for example, Patent Document 1 or Patent Document 2. The synthetic circuit 16 includes a current limiting circuit which prevents overcurrent from being generated at the moment a short circuit occurs and protects the device.

The resistor 17 is an output matching resistor that is connected between the synthetic circuit 16 and the second coil 18. The resistor 17 passes the synthesized signal output from the synthetic circuit 16 to the output terminal 13 through the switching means 19 in an on state and the second coil 18.

The second coil 18 is a bias application coil that is connected between the resistor 17 and the output terminal 13. The second coil 18 passes the synthesized signal which is input from the synthetic circuit 16 through the switching means 19 in the on state and the resistor 17 to the output terminal 13.

The switching means 19 is connected between the synthetic circuit 16 and the resistor 17 and is changed from an on state in which it connects the synthetic circuit 16 and the resistor 17 to an off state when a switching off control signal is input from the control unit 24. The switching means 19 can be, for example, a MOS-based semiconductor switch with a very small on-resistance.

When the switching means 19 is changed from the off state to the on state to return to the original state, the user sees the content of an alarm output from the alarm output unit 25, confirms safety, and performs a manual operation. In addition, when receiving a switching on control signal from the control unit 24 in the off state, the switching means 19 may automatically change from the off state to the on state and return to the original state.

In this example, an output resistance value is determined by the resistance value of the resistor 17, the residual resistance value of the second coil 18, and the on-resistance value of the switching means 19.

The overvoltage protection circuit 20 includes a first overvoltage protection circuit 20a which is connected to the input side of the synthetic circuit 16 and a second overvoltage protection circuit 20b which is connected to the output side of the synthetic circuit 16.

The first overvoltage protection circuit 20a is connected between the first coil 15 and the synthetic circuit 16. When the switching means 19 is turned off, the first overvoltage protection circuit 20a clamps a high voltage which is generated by energy stored in the second coil 18 to a constant voltage and prevents a current corresponding to the high voltage from flowing to the synthetic circuit 16 or the device under test (DUT).

The second overvoltage protection circuit 20b is connected between the resistor 17 and the second coil 18. When the switching means 19 is turned off, the second overvoltage protection circuit 20b clamps a high voltage which is generated by energy stored in the second coil 18 to a constant voltage and prevents a current corresponding to the high voltage from flowing to the device under test (DUT) or the input terminal 11. Each of the first overvoltage protection circuit 20a and the second overvoltage protection circuit 20b can be a known clamp circuit, which is not particularly illustrated in the drawings. Specifically, each of the first overvoltage protection circuit 20a and the second overvoltage protection circuit 20b is a clamp circuit in which a diode having an anode to which a positive power supply voltage is applied and a diode having a cathode to which a negative power supply voltage is applied are connected in series to each other and a connection point between the two diodes is connected between the resistor 17 and the second coil 18 or a clamp circuit in which two zener diodes are connected in series to each other, with cathodes facing each other, an anode of one of the two zener diodes is connected between the resistor 17 and the second coil 18, and an anode of the other zener diode is grounded. In addition, the anode and the cathode can be interchanged.

The potential difference detection unit 21 detects a potential difference between both ends of the resistor 17 and includes, for example, a buffer amplifier and a difference calculation circuit. The potential difference detection unit 21 buffers the voltage between both ends of the resistor 17 using the buffer amplifier. In addition, the potential difference detection unit 21 amplifies and converts the potential difference between both ends of the resistor 17 into a voltage value which is proportional to a current value using the difference calculation circuit.

The threshold voltage generator 22 generates positive and negative threshold voltages and inputs the generated positive and negative threshold voltages to the comparison circuit 23.

The comparison circuit 23 is a widow comparator, compares the voltage value from the potential difference detection unit 21 with the positive and negative threshold voltages corresponding to the upper limits of the positive and negative current values, and determines whether the voltage value from the potential difference detection unit 21 is within the range of the positive and negative threshold voltages. When it is determined that the voltage value from the potential difference detection unit 21 exceeds the positive or negative threshold voltage, the comparison circuit 23 outputs an overcurrent detection signal indicating that an offset current caused by overcurrent flows to the resistor 17.

In this example, the term "short circuit" includes a phenomenon in which a large potential difference occurs between both ends of the second coil 18 due to the offset voltage. When a rapid change in the potential difference due to the short circuit occurs, a voltage caused by the potential difference is generated between both ends of the second coil 18. Therefore, the positive and negative threshold voltages of the comparison circuit 23 are set in advance to proper values corresponding to the voltage caused by the potential difference when a rapid change in the potential difference occurs due to the short circuit of the output.

When the overcurrent detection signal is input from the comparison circuit 23, the control unit 24 outputs the switching off control signal to the switching means 19 to turn off the switching means 19 and controls the turn-on or turn-off of the alarm output unit 25.

When the overcurrent detection signal is input from the comparison circuit 23, the control unit 24 may start a timer provided therein. When a predetermined set time (for example, from a few seconds to a few minutes) has elapsed, the control unit 24 may output the switching on control signal to the switching means 19 to turn on the switching means 19, increase the offset voltage output from the offset voltage generator 3 in proportion to time, and automatically control the value of the offset voltage such that the offset voltage slowly increases to a target voltage.

The alarm output unit 25 is, for example, a display or a buzzer and outputs an alarm indicating to the user that the overcurrent detection signal has been detected, using display or sounds, under the control of the control unit 24, when the overcurrent detection signal is input from the comparison circuit 23 to the control unit 24.

The storage unit 26 stores a data log which indicates the history of a series of processes from the start to the stop of the device and includes an error log indicating a history when the comparison circuit 23 outputs the overcurrent detection signal indicating the occurrence of a failure (the generation of an abnormal voltage due to the generation of a high-voltage pulse by the second coil 18). The error log stored in the storage unit 26 can be used as information used to investigate the cause of the generation of the abnormal voltage due to the generation of the high-voltage pulse by the second coil 18 and can also be used to provide services to the user of the digital signal offset adjustment device.

Second Embodiment

Next, a second embodiment of the pulse pattern generation apparatus including the digital signal offset adjustment device according to the invention will be described with reference to FIG. 2.

Figure 2:
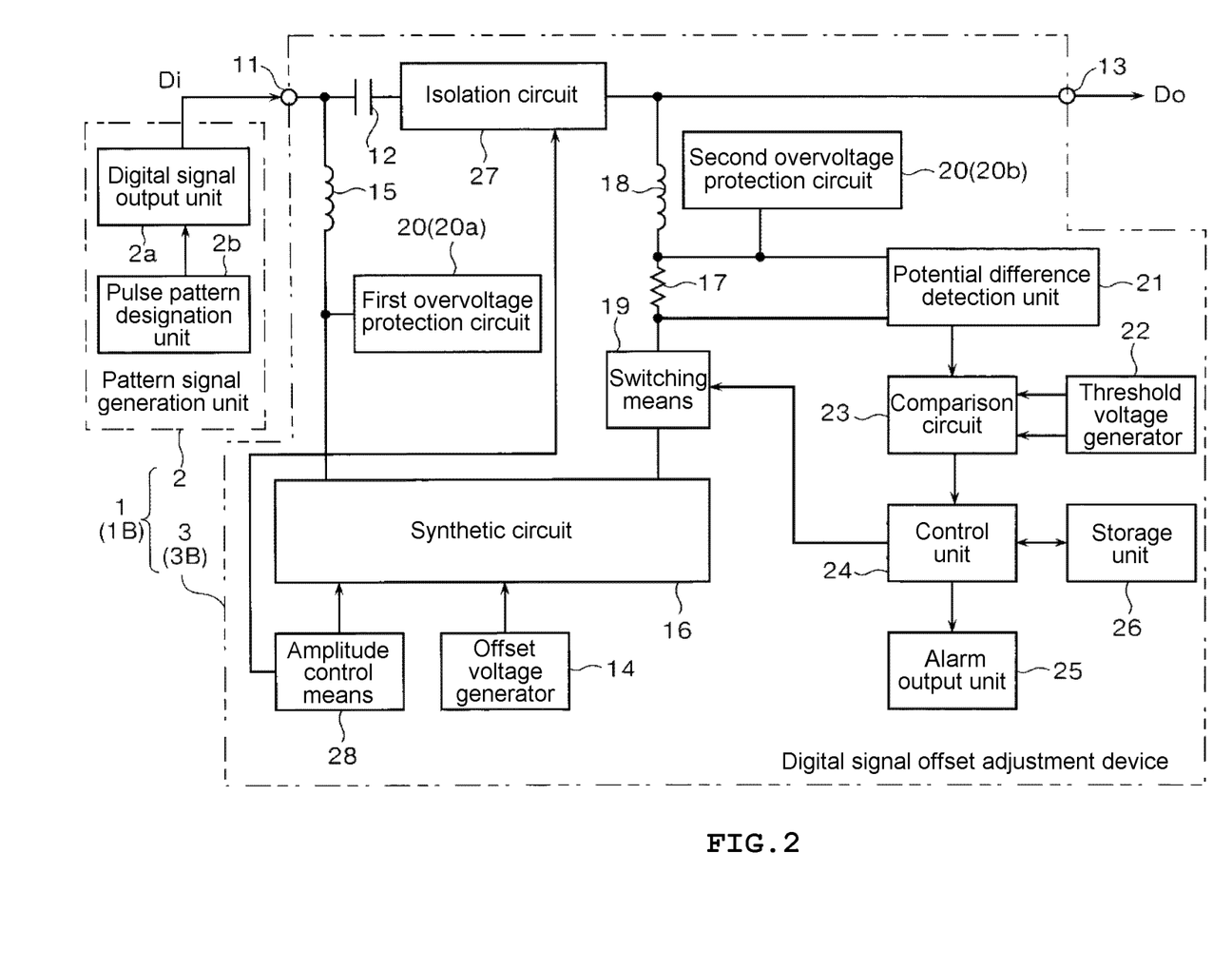
FIG. 2 is a block diagram illustrating a second embodiment of the pulse pattern generation apparatus including the digital signal offset adjustment device according to the invention.

In a pulse pattern generation apparatus 1B according to the second embodiment illustrated in FIG. 2, the same components as those in the pulse pattern generation apparatus 1A according to the first embodiment illustrated in FIG. 1 are denoted by the same reference numerals and the description thereof will not be repeated.

As illustrated in FIG. 2, the pulse pattern generation apparatus 1 (1B) according to the second embodiment includes an isolation circuit 27 and an amplitude control means 28, in addition to the structure of the pulse pattern generation apparatus 1A according to the first embodiment, that is, the input terminal 11, the capacitor 12, the output terminal 13, the offset voltage generator 14, the first coil 15, the synthetic circuit 16, the resistor 17, the second coil 18, the switching means 19, the overvoltage protection circuit 20, the potential difference detection unit 21, the threshold voltage generator 22, the comparison circuit 23, the control unit 24, the alarm output unit 25, and the storage unit 26.

The isolation circuit 27 is connected between the capacitor 12 and the output terminal 13, transmits a signal from the input terminal 11 to the output terminal 13 without any loss, and prevents the transmission of a signal from the output terminal 13 to the input terminal 11.

The isolation circuit 27 includes, for example, a broadband amplifier or a broadband buffer and obtains high isolation between an input and an output in a wide band from a frequency close to a direct current to several tens of gigahertz. The isolation circuit 27 can include, for example, a broadband amplifier (or a broadband buffer), a series circuit of a resistor and a coil which is used for power supply and low frequency termination, and a DC cut capacitor, as illustrated in FIG. 2(a) of Patent Document 2.

The amplitude control means 28 variably controls the gain of the broadband amplifier of the isolation circuit 27 on the basis of a designated amplitude value. The control unit 24 may have the function of the amplitude control means 28.

In the pulse pattern generation apparatus 1B illustrated in FIG. 2, a digital signal offset adjustment device 3B includes the isolation circuit 27 that prevents the reverse flow of a signal from the output terminal 13 to the input terminal 11. However, it is preferable to provide the first overvoltage protection circuit 20a which is connected to the input side of the synthetic circuit 16.

In the pulse pattern generation apparatuses 1A and 1B illustrated in FIGS. 1 and 2, the frequency characteristic compensation circuit disclosed in Patent Document 1 may be provided in the synthetic circuit 16, which is not particularly illustrated in the drawings. The frequency characteristic compensation circuit compensates for a reduction in the gain in a specific frequency range in a signal path from the input terminal to the output terminal. Specifically, the frequency characteristic compensation circuit has a function (peaking effect) of increasing the gain in a frequency band in the vicinity of the upper limit of an AC component, which is a low-frequency component of the digital signal Di, using an increase in the gain of the operational amplifier in the synthetic circuit 16 and the attenuation of a signal (reduction in the gain) due to the impedance of the first coil 15 and the second coil 18.

Next, an operation when the pulse pattern generation apparatus 1 (1A or 1B) having the above-mentioned structure is used to test the device under test will be described.

When the switching means 19 is in an on state and the pulse pattern generation apparatus 1A is turned on, the digital signal Di is input from the digital signal output unit 2a of the pattern signal generation unit 2 to the input terminal 11. In the digital signal Di input to the input terminal 11, a DC component and a low-frequency component are input to the synthetic circuit 16 through the first coil 15 and an AC component is transmitted to the output terminal 13 through the capacitor 12.

In the pulse pattern generation apparatus 1B illustrated in FIG. 2, the AC component of the digital signal Di input to the input terminal 11 is transmitted to the output terminal 13 through the capacitor 12 and the isolation circuit 27.

When the DC component and the low-frequency component of the digital signal Di are input through the first coil 15, the synthetic circuit 16 synthesizes an offset voltage which is a DC voltage output from the offset voltage generator 14 with the DC component and the low-frequency component and transmits a synthesized signal obtained by the synthesis to the output terminal 13 through the switching means 19 in an on state, the resistor 17, and the second coil 18. Then, a digital signal Do obtained by adding the synthesized signal from the synthetic circuit 16 to the AC component of the digital signal Di is output from the output terminal 13.

The digital signal Do output from the output terminal 13 is input as a test signal to the device under test (DUT) (not illustrated) which is connected through, for example, a coaxial cable. Various tests are performed for the device under test using the test signal which is a desired pattern signal.

The potential difference detection unit 21 detects a potential difference between both ends of the resistor 17 for output matching and outputs a detection signal corresponding to the detected potential difference to the comparison circuit 23. When the detection signal is input from the potential difference detection unit 21, the comparison circuit 23 compares the voltage value of the detection signal with predetermined positive and negative threshold voltages input from the threshold voltage generator 22. Then, the comparison circuit 23 outputs an overcurrent detection signal to the control unit 24 when the voltage value of the detection signal exceeds the positive or negative threshold voltage, that is, when a large potential difference or current difference occurs with respect to an offset voltage due to the short circuit or opening of the output and an abnormal voltage is generated due to a transient response caused by the coil 18, which results in the occurrence of EOS.

When the overcurrent detection signal is input from the comparison circuit 23, the control unit 24 outputs an alarm signal to the alarm output unit 25. When the alarm signal is input from the control unit 24, the alarm output unit 25 outputs an alarm indicating that overcurrent has been generated on the output side to the user, using, for example, display or sounds. At the same time, the control unit 24 outputs a switching off control signal to the switching means 19 to change the switching means 19 from the on state to an off state. In this way, the synthetic circuit 16 and the resistor 17 are forcibly disconnected from each other and the synthesized signal from the synthetic circuit 16 is not transmitted to the output terminal 13. As a result, the synthetic circuit 16 is protected. At that time, the digital signal Di input to the input terminal 11 is not synthesized with the synthesized signal from the synthetic circuit 16 and only the AC component of the digital signal Di which has passed through the capacitor 12 due to AC coupling is output from the output terminal 13.

When the switching means 19 is turned off, a high voltage is generated by energy stored in the second coil 18 and the generated high voltage is maintained. Therefore, in this example, the overvoltage protection circuit 20 (the first overvoltage protection circuit 20a and the second overvoltage protection circuit 20b) clamps the voltage between the resistor 17 and the second coil 18 to a constant voltage and the device under test or the synthetic circuit 16 is protected from the influence of the high voltage.

When the apparatus is manually returned from the overcurrent protection state, the user who has confirmed the content of the alarm output from the alarm output unit 25 operates a return button to change the switching means 19 from the off state to the on state. According to this structure, the user can check the state of the pulse pattern generation apparatus 1 (1A or 1B) and safely return the pulse pattern generation apparatus 1 to the original state using a manual operation. In addition, the return button may be allocated to a software key on a measurement display screen or a button on an operation panel of the apparatus.

In a case in which the apparatus automatically returns from the overcurrent protection state, when a predetermined set time has elapsed from the input of the overcurrent detection signal from the comparison circuit 23, the control unit 24 performs switching control such that the switching means 19 is changed from the off state to the on state. At the same time, the control unit 24 automatically controls the value of the offset voltage added to the low-frequency component of the digital signal Di and the signal of the DC component such that the value of the offset voltage slowly increases to a target voltage in proportion to time. Therefore, even when the short circuit is opened and the apparatus automatically returns to the original state, the offset voltage of the target voltage is not suddenly applied to the digital signal Do output from the output terminal 13. As a result, the apparatus safely returns from the overcurrent protection state. The administrator or user of the apparatus may set the return mode of the apparatus from the overcurrent protection state to a manual return mode or an automatic return mode in advance.

As such, according to the pulse pattern generation apparatus 1 (1A or 1B) including the digital signal offset adjustment device 3 (3A or 3B) of this example, when the output is short-circuited and the potential difference between both ends of the resistor 17 exceeds the positive or negative threshold value, the flow of the offset current from the synthetic circuit 16 to the second coil 18 is cut off and the supply of energy to the second coil 18 is stopped. Then, when the flow of the offset current is cut off, the overvoltage protection circuit 20 (the first overvoltage protection circuit 20a and the second overvoltage protection circuit 20b) clamps the voltage between the first coil 15 and the synthetic circuit 16 and the voltage between the second coil 18 and the resistor 17 to a constant voltage. Therefore, it is possible to protect, for example, an internal circuit (for example, a high-frequency amplifier provided in the isolation circuit 27) which has low resistance to EOS or the device under test which is connected to the output terminal 13 by a connector from a high voltage (abnormal voltage) generated by energy stored in the second coil 18.

In addition, the pulse pattern generation apparatus 1 includes the alarm output unit 25 that outputs an alarm when the output is short-circuited and an offset output current that exceeds a threshold value flows. Therefore, it is possible to output a visual or audible alarm to the user of the apparatus. As a result, the user can check the current state of the apparatus and perform a manual operation of safely opening the short circuit of the output and returning the apparatus to its original state.

When the short circuit of the output is opened and the apparatus automatically returns to its original state, automatic control is performed such that the value of the offset voltage added to the low-frequency component of the digital signal Di and the signal of the DC component slowly increases to a target voltage in proportion to time. Therefore, the offset voltage of the target voltage is not suddenly applied to the digital signal Do output from the output terminal 13 and it is possible to safely return the apparatus to its original state.

In the first and second embodiments, the pulse pattern generation apparatus 1 (1A or 1B) includes the pattern signal generation unit 2 and the digital signal offset adjustment device 3 (3A or 3B). However, the pattern signal generation unit 2 may be omitted and only the digital signal offset adjustment device 3 (3A or 3B) may be provided independently of other devices.

The preferred embodiments of the digital signal offset adjustment device and an output protection method using the digital signal offset adjustment device according to the invention have been described above. However, the invention is not limited by the description of these embodiments and the drawings. That is, for example, other embodiments, examples, and operation techniques which can be made by those skilled in the art on the basis of the above-described embodiments are included in the scope of the invention.

DESCRIPTION OF REFERENCE NUMERALS AND SIGNS (1A, 1B): PULSE PATTERN GENERATION APPARATUS
2: PATTERN SIGNAL GENERATION UNIT
3 (3A, 3B): DIGITAL SIGNAL OFFSET ADJUSTMENT DEVICE
11: INPUT TERMINAL
12: CAPACITOR
13: OUTPUT TERMINAL
14: OFFSET VOLTAGE GENERATOR
15: FIRST COIL
16: SYNTHETIC CIRCUIT
17: RESISTOR
18: SECOND COIL
19: SWITCHING MEANS
(20a, 20b): OVERVOLTAGE PROTECTION CIRCUIT
21: POTENTIAL DIFFERENCE DETECTION UNIT
22: THRESHOLD VOLTAGE GENERATOR
23: COMPARISON CIRCUIT
24: CONTROL UNIT
25: ALARM OUTPUT UNIT
26: STORAGE UNIT
27: ISOLATION CIRCUIT
28: AMPLITUDE CONTROL MEANS
101: DIGITAL SIGNAL OFFSET ADJUSTMENT DEVICE
102: INPUT TERMINAL
103: BIAS VOLTAGE SETTING UNIT
104: DC VOLTAGE GENERATOR
105: OUTPUT TERMINAL
106: CAPACITOR
107: FIRST COIL
108: SECOND COIL
109: SYNTHETIC CIRCUIT
109a: FREQUENCY CHARACTERISTIC COMPENSATION CIRCUIT

What is claimed is:

1. A digital signal offset adjustment device comprising:
an input terminal;
an output terminal;
a capacitor that is provided between the input terminal and the output terminal and transmits an AC component of a digital signal input to the input terminal to the output terminal;
a first coil that has one end connected to the input terminal and passes a DC component and a low-frequency component of the digital signal input to the input terminal;
a second coil that has one end connected to the output terminal;
an offset voltage generator that generates an offset voltage which is an arbitrary DC voltage;
a synthetic circuit that synthesizes the offset voltage output from the offset voltage generator with the DC component and the low-frequency component of the digital signal output from the other end of the first coil and supplies the synthesized signal to the other end of the second coil;
a resistor that is used for output matching and has one end connected to the other end of the second coil;
switching means that has one end connected to the other end of the resistor and the other end connected to the synthetic circuit and connects or disconnects the synthetic circuit to or from the other end of the resistor;
a potential difference detection unit that detects a potential difference between both ends of the resistor;
a comparison circuit that compares a voltage value of a detection signal from the potential difference detection unit with a predetermined threshold voltage and outputs an overcurrent detection signal when the voltage value of the detection signal exceeds the threshold voltage; and
a control unit that receives the overcurrent detection signal from the comparison circuit and turns off the switching means.

2. The digital signal offset adjustment device according to claim 1, further comprising:
an isolation circuit that is connected in series to the capacitor between the input terminal and the output terminal, transmits a signal from the input terminal to the output terminal, and prevents the transmission of a signal from the output terminal to the input terminal.

3. The digital signal offset adjustment device according to claim 1, further comprising:
an overvoltage protection circuit that clamps a high voltage which is generated by energy stored in the second coil to a constant voltage when the switching means is turned off.

4. The digital signal offset adjustment device according to claim 1,
wherein, when a predetermined time has elapsed from the turn-off of the switching means, the control unit turns on the switching means and changes the offset voltage to a target voltage over time to perform output control.

5. The digital signal offset adjustment device according to claim 1, further comprising:
a storage unit that stores an error log when the comparison circuit outputs the overcurrent detection signal indicating the occurrence of a failure.

6. A pulse pattern generation apparatus comprising:
a pattern signal generation unit that generates a digital signal with an arbitrary pattern; and
the digital signal offset adjustment device according to claim 1 that applies an offset voltage which is a desired DC voltage to the digital signal output from the pattern signal generation unit and outputs the digital signal.

7. A digital signal offset adjustment method comprising:
a step of transmitting an AC component of a digital signal input to an input terminal to an output terminal through a capacitor;
a step of transmitting a DC component and a low-frequency component of the digital signal input to the input terminal through a first coil that has one end connected to the input terminal;
a step of generating an offset voltage which is an arbitrary DC voltage;
a step of supplying a synthesized signal, which is obtained by synthesizing the offset voltage with a signal output from the other end of the first coil, from a synthetic circuit for supplying the synthesized signal to the other end of a second coil that has one end connected to the output terminal;
a step of supplying the synthesized signal through a resistor that is used for output matching and has one end connected to the other end of the second coil;
a step of detecting a potential difference between both ends of the resistor and outputting a detection signal;

a step of outputting an overcurrent detection signal when a voltage value of the detection signal exceeds a predetermined threshold voltage; and a step of receiving the overcurrent detection signal and turning off switching means that has one end connected to the other end of the resistor and the other end connected to the synthetic circuit and connects or disconnects the synthetic circuit to or from the other end of the resistor.

8. The digital signal offset adjustment method according to claim 7, further comprising:

a step of connecting an isolation circuit in series to the capacitor between the input terminal and the output terminal, transmitting a signal from the input terminal to the output terminal, and preventing the transmission of a signal from the output terminal to the input terminal.

9. The digital signal offset adjustment method according to claim 7, further comprising:

a step of clamping a high voltage which is generated by energy stored in the second coil to a constant voltage when the switching means is turned off.

10. The digital signal offset adjustment method according to claim 7, further comprising:

a step of turning on the switching means and changing the offset voltage to a target voltage over time to perform output control, when a predetermined time has elapsed from the turn-off of the switching means.

11. The digital signal offset adjustment method according to claim 7, further comprising:

a step of storing an error log when the comparison circuit outputs the overcurrent detection signal indicating the occurrence of a failure.

* * * * *